Jan. 3, 1933.  M. P. WINTHER ET AL  1,893,346
POWER TRANSLATOR
Filed Nov. 22, 1928  6 Sheets-Sheet 1
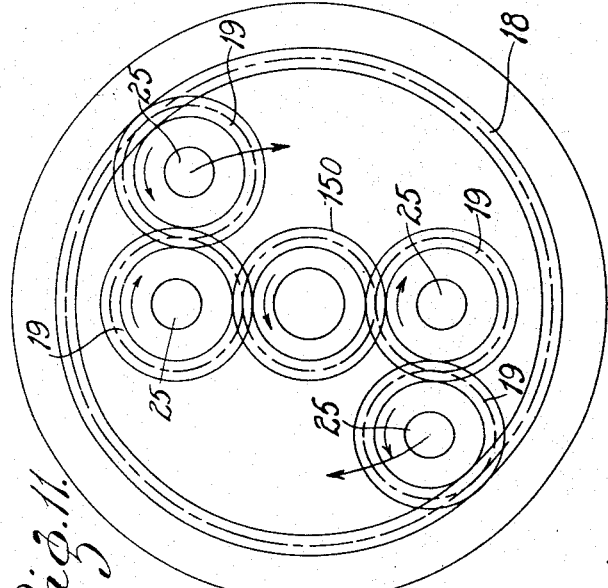
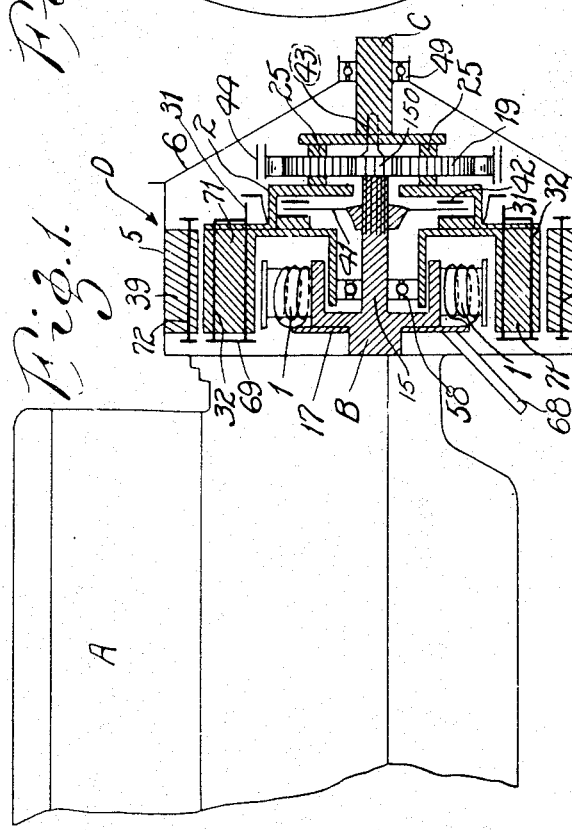
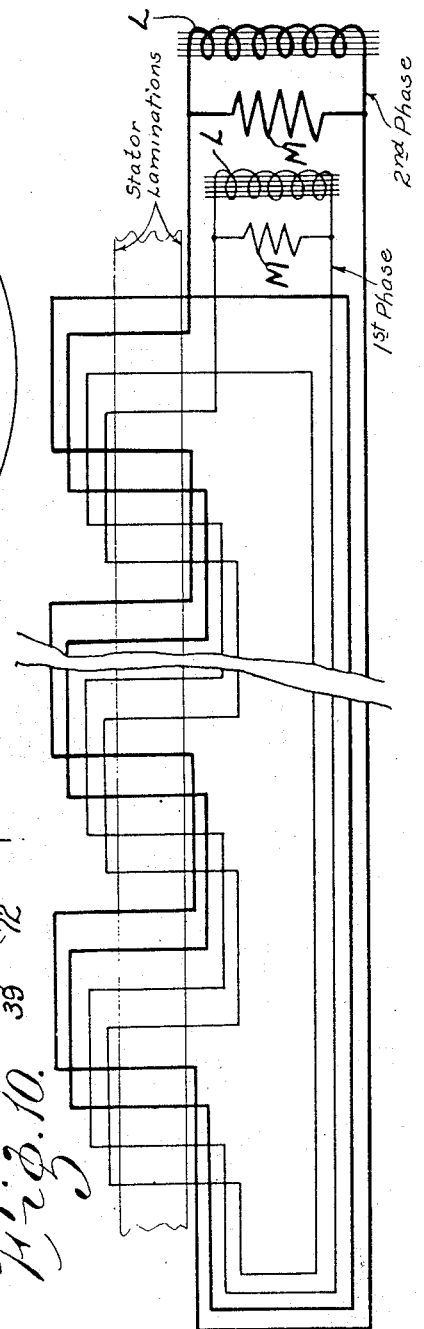

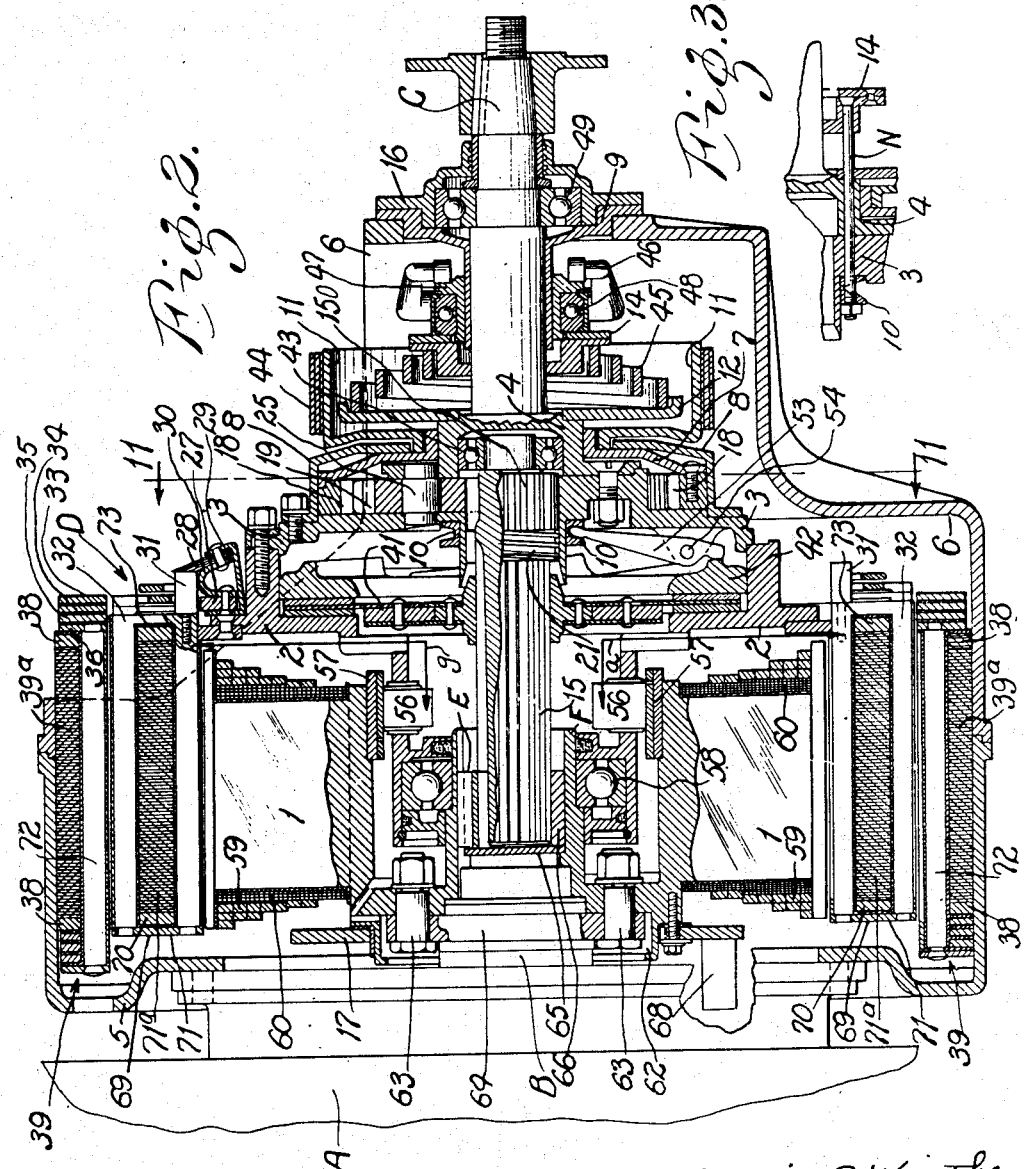

Jan. 3, 1933.  M. P. WINTHER ET AL  1,893,346

POWER TRANSLATOR

Filed Nov. 22, 1928  6 Sheets-Sheet 3

Martin P. Winther,
Anthony Winther,
Inventors
Delos G. Haynes
Attorney

Jan. 3, 1933.　　　M. P. WINTHER ET AL　　　1,893,346
POWER TRANSLATOR
Filed Nov. 22, 1928　　6 Sheets-Sheet 4

Martin P. Winther,
Anthony Winther,
Inventors
Delos G. Haynes,
Attorney

Jan. 3, 1933.  M. P. WINTHER ET AL  1,893,346
POWER TRANSLATOR
Filed Nov. 22, 1928   6 Sheets-Sheet 5

Fig. 9.

{TO THE BRUSHES ON THE RECTIFYING COMMUTATOR}

Martin P. Winther.
Anthony Winther.
Inventors
Deloz G. Haynes
Attorney

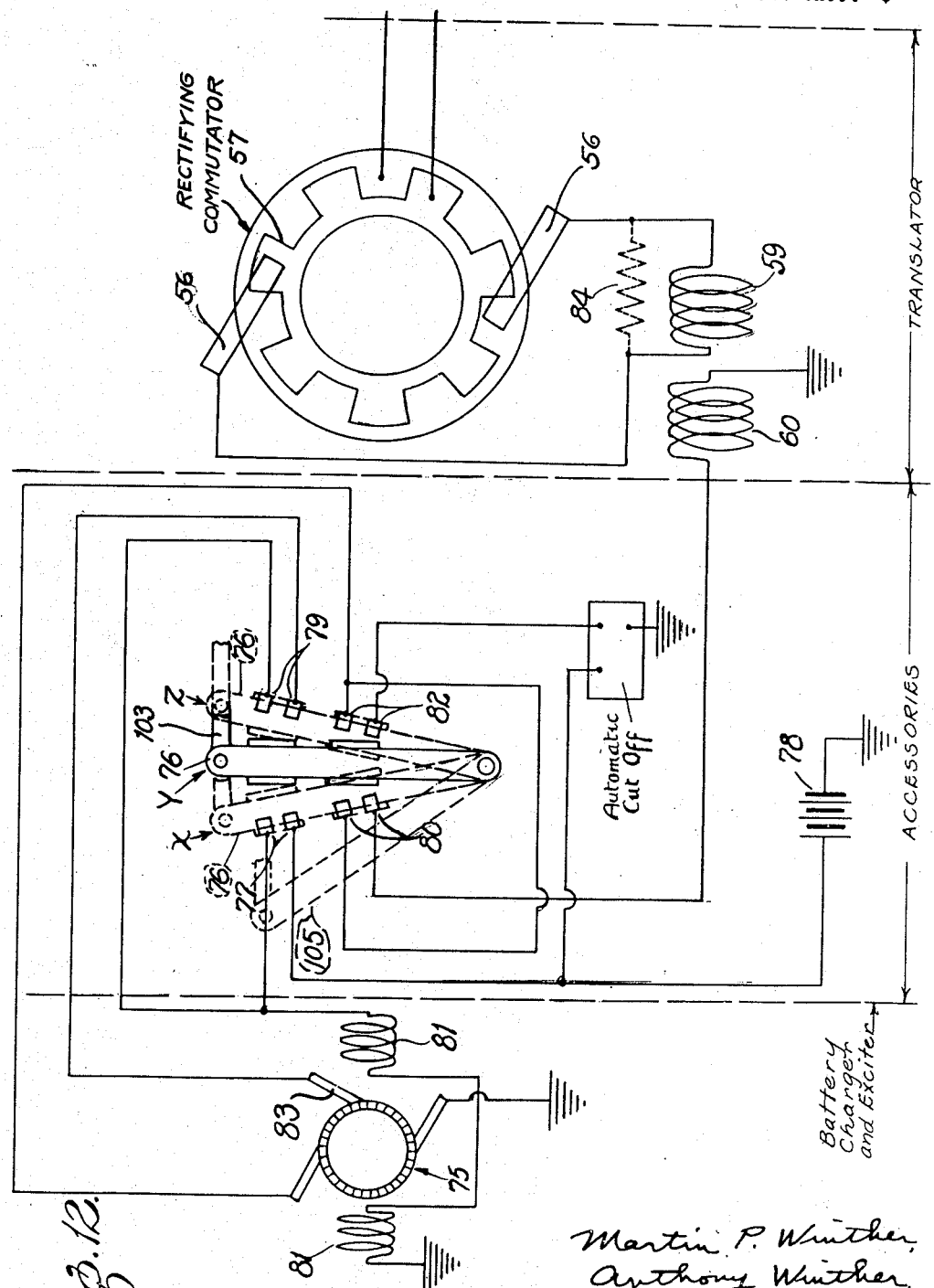

Patented Jan. 3, 1933

1,893,346

UNITED STATES PATENT OFFICE

MARTIN PHILLIP WINTHER, OF CHICAGO, ILLINOIS, AND ANTHONY WINTHER, OF KENOSHA, WISCONSIN, ASSIGNORS TO THE WINTHER COMPANY, OF WILMINGTON, DELAWARE, A CORPORATION OF DELAWARE

POWER TRANSLATOR

Application filed November 22, 1928. Serial No. 321,071.

This invention relates to electrical power translators, and with regard to certain more specific features to an alternating current power translator for use more especially in motor vehicles and the like, but being applicable also to other purposes.

Among the several objects of the invention may be noted the provision of means for translating power from a prime mover to the driving wheels of a vehicle so as to adapt the limited effective speed-torque range of the former to the unlimited effective speed-torque range imposed on the latter, wherein electrical means functioning with alternating current is used, whereby the advantage is had of eliminating sliding contacts for carrying an electrical power circuit; the provision of a device of the class described having a short power circuit with a consequent reduction in weight and losses; and the provision of a device of the class described wherein a rotor used for driving the propeller shaft is actuated both by engine torque and electrical motor torque. This device is an improvement in the construction set out in the patent application of Martin Phillip Winther, Serial No. 173,495, filed March 7, 1927, patented August 12, 1930, Patent No. 1,772,473. The present application is also related to the application of Martin Phillip Winther for power translator, filed February 21, 1929, Patent No. 1,836,298, the same having been copending. The latter patent refers to a certain gear arrangement not shown herein. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings in which is illustrated one of various possible embodiments of the invention, Fig. 1 is a diagrammatic side elevation showing the translator applied to a prime mover;

Fig. 2 is a longitudinal section taken through the translator per se;

Fig. 3 is a fragmentary section showing a clutch release rod detail;

Fig. 9 is a diagrammatic view of a magnet spider, a rotor and a stator showing electrical and magnetic field action as viewed from the left of Fig. 2;

Fig. 10 is a diagram of the stator windings shown in Fig. 6;

Fig. 11 is a diagrammatic section taken substantially on line 11—11 of Fig. 2, illustrating an epicyclic reversing gear; and Fig. 12 is a diagram illustrating certain excitation and control accessories.

Similar reference characters indicate corresponding parts throughout the several views of the drawings.

Figure 4:
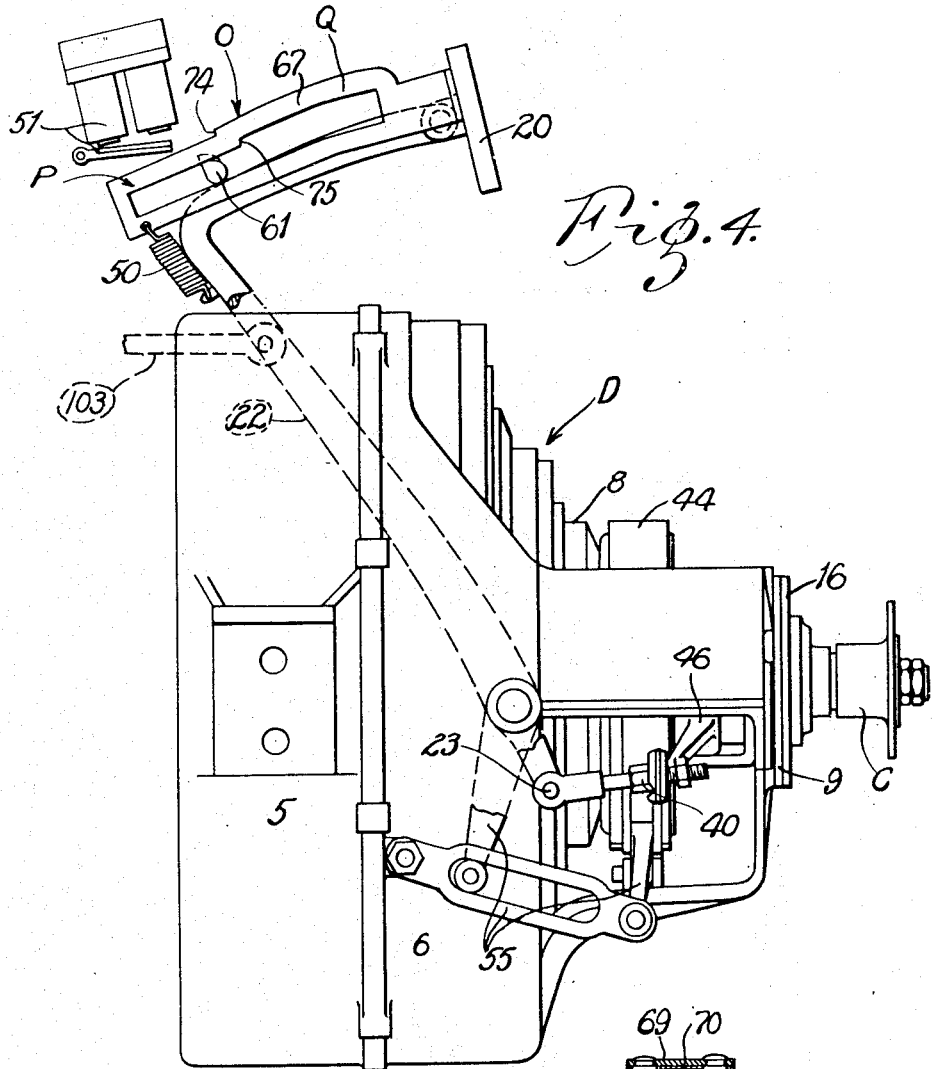
Fig. 4 is a side elevation of the translator, showing certain operating linkages.

Referring now more particularly to Fig. 1 there is illustrated at A a prime mover such as is ordinarily used in automotive construction, that is, one requiring a change in mechanical advantage between it and the point of power application as an acceleration period is passed over so as to adapt the speed-torque range of the prime mover to that at the point of application. The power shaft B of this engine is electrically and/or mechanically connected with a propeller shaft C by means of the translator or transmission D, herein to be described.

Broadly, the translator D comprises a multi-pole magnet spider 1 fastened to the power shaft B and directly rotatable therewith, this magnet spider 1 carrying an extension or clutch shaft 15 pilot at bearing 43 in a part of the propeller shaft system C. The clutch shaft 15 has splined thereto a driving male clutch plate 41.

The propeller shaft system C is attached to and rotates with a rotor 71, the latter being piloted with respect to the magnet spider at bearing 58. The rotor 71 includes a driven clutch drum 2 and clutch pressure plate 42 movable therewith, as well as reverse gear pinion studs 25. The clutch drum 2 and plate 42 form driven female members for the driving male clutch plate 41.

Surrounding the above described parts is a stator 39 in a housing 5, the power shaft B being rotatably borne in respect to the housing 5 as is the propeller shaft C.

The above describes the three relatively rotatable and interacting features of the invention, namely, the rotatable magnet spider rotating field member 1, the intermediate rotor 71 and the stator 39, the rotating field member 1 being adapted to be mechanically clutched with the intermediate rotor 71 at clutch 2, 42 and having an epicyclic reverse gear connection 19 therewith which may be opened and closed at will by means of a certain clutch band 44 to be detailed hereinafter.

The spider 1 forms a rotating field member for generating alternating current in inductor bars 32 located in the intermediate rotor 71. The inductor bars 32 are arranged in an improved and novel manner (to be particularly described) for producing a rotating field at the outer surface of the intermediate rotor, such that said field rotates in a direction opposite to the rotation of the field of the spider 1. This reverse field during its movement cuts certain stationary bar windings or inductors or motor secondaries 72.

Thus it will be seen that a magnetic drag is effected between the spider 1 and rotor 71, whereby the latter tends to be moved in a direction corresponding to the direction in movement of the spider 1. However, the inherent slip between the magnet member 1 and rotor 71 induces current in the inductors 32 and these, by means to be set out, set up a magnetic field externally of the rotor 71 which moves in a direction reverse to the movement of the field due to the spider 1. The result of this external field cutting the stationary inductors 72 is a reaction set up between the rotor 71 and the stator 39, whereby the movement of the rotor is augmented in the direction that it is already travelling rather than resisted, as would be the case were the direction of movement of the external field the same as that of the internal or spider field. The magnet member and the inner inductors on the rotor may be called an alternating current generator, whereas the outer inductors and the stator form an alternating current motor. The drag of the generator is made use of for driving purposes.

With the above in mind, the details of the construction will be set out (see Fig. 2).

The magnet spider 1 includes a separately excited field coil 60 connected with an exciting current collector ring 17, the latter receiving current by way of a separate exciting brush 68 fed from the vehicle battery. Thus the rotating field of the magnet spider is effected. It is to be noted that this is not a field due to induction, but is a simple mechanically rotating field.

The spider 1 is bolted to the end flange of the engine crank or power shaft 64 by as of studs 63, an oil channel 62 being employed to prevent leakage oil from the engine reaching the brush surface of ring 17. A thrust plate 65 is used for holding a clutch shaft 15 in place, a splined collar 66 being used to drive said shaft 15, this collar 66 being keyed at E to an inner integral cup formation F of the spider 1, said cup formation F riding in the centering and piloting ball bearing 58.

At numeral 57 is indicated a rectifying commutator which is fastened to the spider 1 and is engaged by brushes 56, the latter being mounted in a part of the rotor member 71 to be described. Connected to the rectifying commutator 57 is a self-exciting coil 59 overlayed on the coil 60 of the spider 1, the purpose of which will be shown.

Figure 7:
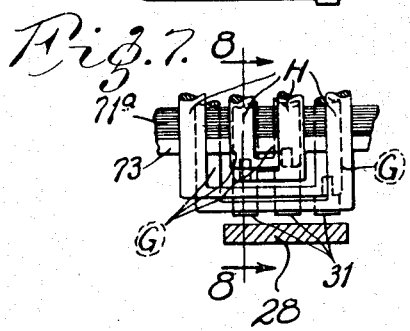
Fig. 7 is a cross section taken substantially on line 7—7 of Fig. 5, and illustrates certain armature bar positions adapted to effect reversal in the direction of movement of an induced magnetic field.
Figure 8:
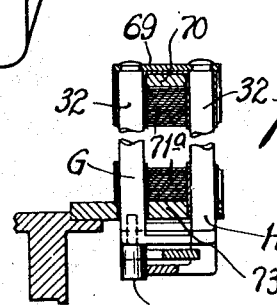
Fig. 8 is a cross section taken on line 8—8 of Fig. 7.
Figure 5:
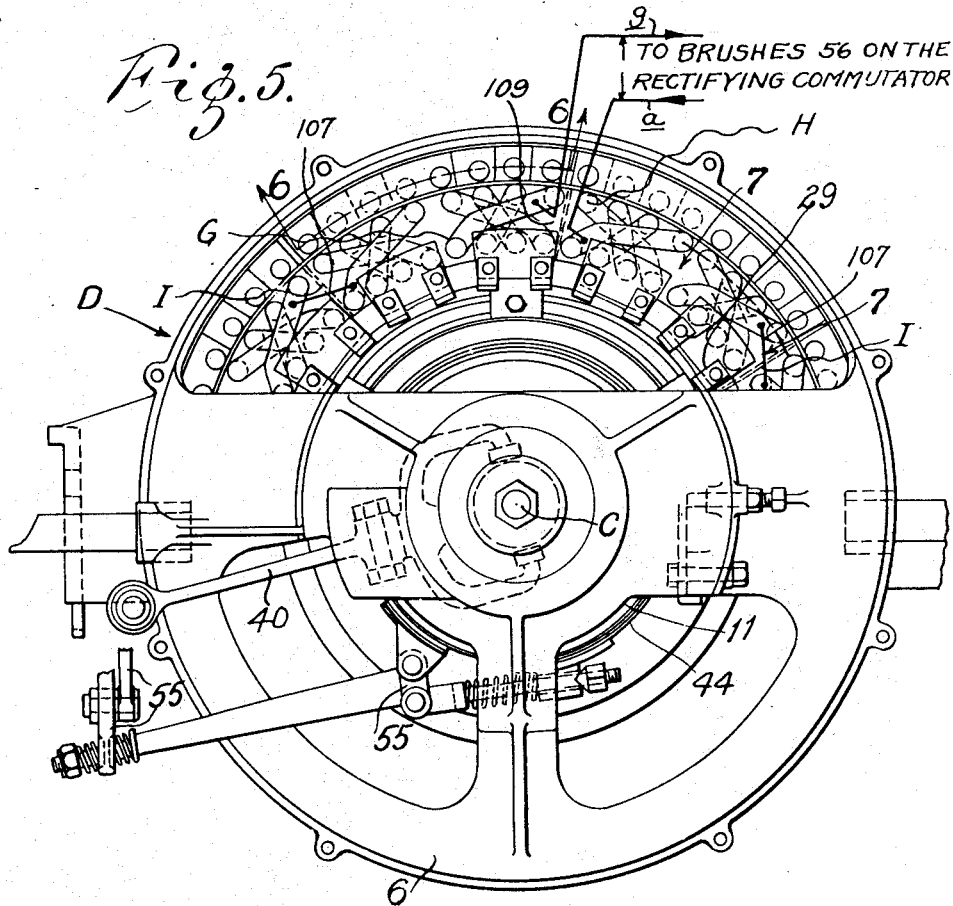
Fig. 5 is a right-end elevation of Fig. 4.

The rotor 71 comprises laminations 71a clamped by suitable bolts between rotor end plates 70 and 73. A split copper end ring 69 is used as a common return for the inductors 32. Each inductor 32 is formed as a U-bar (see also Fig. 8) the open end of which is riveted to the common return ring 69. In the present form of the invention (illustrated in Figs. 1 to 8) there are fourteen groups of these inductors 32, each group consisting of four inductors arranged as illustrated in Figs. 5, 7 and 8. Each group of inductors or windings on the rotor comprises two pairs of U-bars each pair consisting of a crossed arrangement. The exact number of bars in each group is optional and it is not necessary that even numbers be used. The desirable feature is the crossed arrangement. The inductors are electrically connected only at and by way of the ring 69.

It will be seen that as the magnetic fields of the magnet spider sweep across the innermost circular arrangement G of the legs of the U-bars 32, current is induced in these legs G and that the direction of current flow in the innermost set of legs will be opposite to that in the outermost arrangement H of legs, due to the ring flow in each U-bar and the fact that the outermost set H of legs is not so greatly affected by the moving field, being farther therefrom. Also, the maximum or any other predetermined value of current in each of the inner set of legs G occurs in successive legs in a direction corresponding to the rotation of the magnet spider but, due to the crossed arrangement, it will be seen that the oppositely flowing maximum or other predetermined value of currents in the outer set of legs H takes place in successive legs in a direction opposite to the rotation of the magnet spider, this being due to the crossed arrangements of the U-bars or inductors 32 in their respective groups. These inductors, due to their form and action will be referred to hereinafter as flux rotation reversing bars or windings. For purposes of description, these windings or inductors will also be referred to as "X" windings. They are of the cage type. The successive currents flowing in successive lengths H induce successive exterior field or flux conditions which conditions as they change successively advance in a direction opposite to the advance of field conditions due to the magnet spider 1.

There are fourteen poles on the spider 1 in the present embodiment, opposite poles having like polarity and successive peripheral poles having opposite polarity, whereby seven groups of north and south pole combinations are had for inducing current in seven groups of north and south pole combinations of the U-bars 32. Because of this division the bus ring 69 is split into seven sections I (Fig. 5), one section for each double group comprising eight U-bars 32.

At this stage of the description, the simplified diagram of Fig. 9 may be referred to, in which a four pole magnet spider 1 is shown for simplicity, as well as only four groups of crossed inductor bars 32. It will be seen that opposite magnet spider poles have like polarity and successive ones about the periphery have unlike polarity, this being due to the form of the winding 60. As the spider 1 moves clockwise, reference to the upper north pole indicates that the outward sweep J of magnetic lines cuts the inner group of legs G of the bars 32 and that the successive current values will be induced in these legs flowing away from the reader, the successive values advancing clockwise in successive legs G and at the same time return currents flow toward the reader in the outer row of legs H. However, the successive exterior current values move in a counter-clockwise direction due to the crossed construction of the inductors.

It is apparent that the upward flow in the outer legs H induces a flux field K, instantaneous values of which are successively moving counter-clockwise so as to cut the motor secondary inductors 72 successively.

At the same time an adjacent south pole is inducing opposite effects in the inner row of legs G of the adjacent group of four of the cage bars 32 with consequently opposite progressive effects in the outer row of the adjacent four legs H, the reverse acting field having progressive opposite effects on corresponding inductors 72. The result is that each of the legs G in succession goes progressively through all values of current flow, both plus and minus and likewise does each leg H, except that the succession progress is in the reverse peripheral direction. Hence the field K has successive values which rotate or progress in the reverse direction to the successive values of the rotating magnet field. As above forecast, the reaction between the magnet spider and rotor is that of a magnetic drag, whereby the rotor tends to follow the spider but the reaction between the rotor and the stator is that of repulsion, whereby the rotor tends further to be forced in the direction of spider movement.

It is to be understood that the same theory set out in regard to Fig. 9 holds in regard to Figs. 1 to 8, the fewer number of poles being used in Fig. 9 merely to simplify the explanation and incidentally to show that variations may be effected in the number of poles used. It should also be clear that the exact number of crossed U-bar inductors used is a matter of choice, depending upon the smoothness of drag and repulsive action desired.

Referring again to Fig. 2, it will be seen that the motor secondary inductors 72 are embedded in laminations 39a of the stator 39. Both the motor secondary inductors 72 and the rotor inductors 32 are surrounded by insulating mica or the like for insulating them from the laminations and from each other where necessary. The stationary laminations 39a are supported in a stator housing and rear bearing support 6 and are clamped together by end plates 38.

Numerals 33, 34, 35 and 36 indicate end connections for four sets of bar windings or secondary inductors 72 of the motor secondaries. For a simplified diagram, reference may be had to Fig. 10. There are preferably as many inductor bars 72 as outer legs H of the crossed windings which is to say the number of crossed windings multiplied by magnet poles, that is, for the diagrammatic Figs. 9 and 10 this would be $4 \times 4 = 16$, or $4 \times 14 = 56$ in the case of Figs. 1 to 8.

Figure 6:
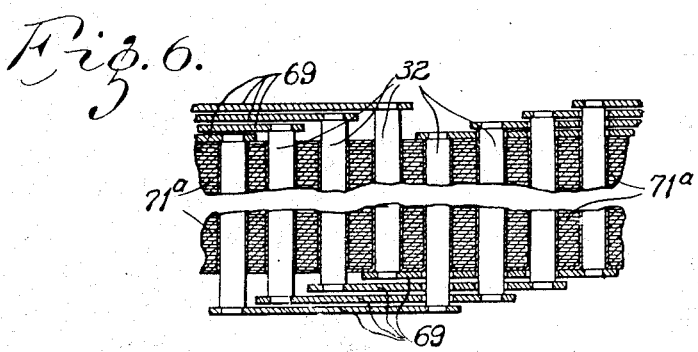
Fig. 6 is a fragmentary view taken on line 6—6 of Fig. 5 and illustrates certain motor secondary inductors or stator windings.

It will be seen that corresponding inductors 72 in each group of four is connected for current circulation through the stator windings. Also, the inductors 72 are divided into two groups providing circulation in phases as indicated in Fig. 10. The number of phases is optional. Reactance coils L are used to throw back current at higher frequency and increase conductance as the frequency lowers. Resistances M are also used for obtaining starting torque. The arrangement is such that $x = r$, where $x$ is the reactance of the circuit in the stator at maximum frequency and $r$ is the resistance of the circuit in the stator. Fig. 6 illustrates the mechanical embodiment for the connections set out.

Referring again to the rotor 71 (Fig. 2), it will be seen that the plate 73 supporting the laminations 71a is riveted to the rotor hub and clutch drum 2, previously referred to as being supported on bearings 58 and carrying brushes 56. This drum 2 is fastened to a clutch lever plate 3, the latter supporting a reverse gear box cover 8 and said reverse pinion studs 25. Within the drum 2 is located a clutch pressure plate 42 adapted to be pressed into frictional engagement and clamping position in respect to the clutch plate 41 which is splined to the clutch shaft 15. Operation of the pressure plate 42 is effected by clutch levers 53, pivoted at pins 54 (three used in the present embodiment), said levers having their operating ends engaging with a grooved collar 10 slidably arranged on an extension of the plate 3.

As indicated in Fig. 3, the ring 10 is provided with extension studs N which pass forwardly through the plate 3 and a portion of a flange 4 of the driven shaft C. Forwardly these studs N engage with a ferrule 14 which is normally pressed forwardly by a clutch spring 45, said spring reacting against the plate 12 fastened to and rotatable with the flange 4. The ferrule 14, and consequently the ring 10 may be moved backwardly against the closing action of the spring 45, this being accomplished by the oscillating action of the clutch operating yoke 46 on a collar 47, a bearing 48 being interposed between the collar 47 and the ferrule 14 for permitting free relative rotation. The collar rides on an extension of a rear bearing retainer 9, the latter having a cap 16 for supporting the driven shaft C upon bearing 49.

From the above it will be seen that the rotor 71 may be driven electrically when the clutch is open, that is, when the spring 45 is compressed by oscillation of the yoke 46. When the spring 45 is released, the ring 10 is drawn forwardly to move the lever 53, so that the pressure plate 42 clamps the clutch plate 41, the clutch being thus closed for direct drive from the prime mover to the propeller shaft.

Within the reverse gear box cover 8 is rotatably mounted an internal gear 18 fastened to a gear plate 7, the latter in turn being fastened to a reverse operating drum 11. It is apparent that if no resistance is applied to the drum 11 that the internal gear 18 will rotate with the cover 8 but when the drum 11 is held stationary, such as by the frictional application of a reverse band 44, that said internal gear will be held stationary relative to the rotating parts.

Referring to Figs. 2 and 11, it will be seen that the studs 25 carry meshed pairs of idling pinions or reverse gears 19, one of each pair meshing with the reverse gear pinion 150 and the other meshing with the internal gear 18.

As long as the drum 11 is free, there is no relative rotation between the gears 150, 19 and 18, said group rotating as an integral mass. When the band 44 is frictionally applied to the drum 11, the annular gear 18 is constrained to remain stationary, whereupon the pinion 150 drives the pinions 19 to rotate so that the outer pinions act epicyclically and move along the periphery of the internal gear 18, this movement being in an angular direction reverse to the angular direction of movement of the pinion 150. This results in the studs 25 being forced around in the reverse direction, thereby carrying the whole rotor 71 backwards and therefore carrying the flange 4 and the driven shaft C backwards in respect to the drive shaft B. Numeral 21 indicates an oil ring for deflecting oil inwardly to the reverse gear.

It is apparent that means should be provided for coordinating the clutching and reverse operations such that there is no interference. The method used is illustrated more particularly in Figs. 4 and 5, wherein a pedal 20 is shown pivoted to a lever arm 22 and resiliently held thereto by spring 50, the lever arm 22 also being pivoted and engaging at 23 with a linkage 40 for operating the yoke 46, so that the clutch may be opened and closed. The operation is such that when the pedal is allowed to move to the right (Fig. 4) under the action of the clutch spring 45, then the clutch is closed, as is usual in clutch operation. The pedal 20 has a yoke 67 formed integral therewith to which the spring 50 is fastened and which is notched at 74 and 75.

A magnetically operated latch is provided as shown at numeral 51 for preventing the pedal from being normally depressed far enough so that the reverse friction band 44 engages the drum 11. This magnetic latch is operated from a push button on the steering column and when in clearing position permits the pedal to be depressed far enough, not only to open the clutch but also to apply the friction band, application of the friction band being effected by way of linkage 55.

When the pedal is depressed so that a fixed stop 61 is relatively to yoke 67 at point O, the machine is prepared for forward electrical drive. The stop 61 is in notch 75. Inadvertent reversal will not occur, because the latch 51 engages notch 74 and it requires another manual operation of the control for latch 51 before reversal can be effected. Electrical drive can be continued without attention from the operator, the notch 75 being hooked over the stop 61.

When the pedal is let back or up, so that the stop 61 is relatively to yoke 67 at position P, then the electrical drive is rendered inoperative, there being no relative motion of the rotating parts, the clutch being closed or engaged to provide a direct mechanical drive.

To effect reverse operation the circuit for the latch 51 is closed, thereby clearing it from the notch 74, after which the pedal may be depressed entirely so that the stop is positioned at Q relatively to the yoke 67.

It will be seen that the vehicle as a whole may be rocked under its own power and oscillations thereof backward and forward synchronized readily by moving the clutch pedal mechanism alternately between positions and representing forward electrical drive and reverse drive. This feature of operation is desirable in maneuvering the vehicle out of difficult situations such as in mud holes and snow drifts.

Referring again to Figs. 2, 5, 7 and 8 there may be noted at numerals 31 certain extensions associated with, three of each set of generator inductors 32 for short circuiting purposes and adapted to be engaged by brushes 28 supported on a short circuited ring 27, the support being effected by spring members 29 and electrical engagement being effected by flexible portions 30. The purpose of this construction is to short circuit three out of each group of four of the generator inductors 32 so as to bring the slip between the engine and propeller shaft to near mechanical synchronism. If self excitation of the machine is not desired, then all of the inductors may be shorted. The short circuit arrangement bridges the torque gap between the prime mover and point of application from starting to free running conditions. The short circuiting cuts out operation as a motor, thereby reducing the net torque to that had due to drag only. The operation is effected by centrifugal force acting on the brushes 28 as the speed increases. The device is designed to effect short circuit at about 20 to 25 miles per hour of velocity for the vehicle so that this near-synchronism state holds over the most used driving range. The fourth bar 32 in each group of four bars is not shorted, due to the requirement that some current be supplied for the self-excited coils 59 of the field magnets.

It will be seen that this current from the remaining bars is alternating and that direct current is required in said coils 59. Referring to Fig. 5, it will be seen that each separate section I of the bus ring 69 engages two sets of "X" windings, one "X" winding being in opposite phase to its mate. Wiring of the remaining U-bars (one out of each set, after short circuiting of groups, of three U-bars has taken place) is accomplished by having electrically joined the forward loop of each U-shape of each non-short-circuited bar as illustrated at numerals 107. The loops of all are already rearwardly joined by the segments I. The above connections are made across the gap between each of the sections I, with one exception, wherein at 109 the connection is opened and led to said brushes 56, the current being fed from there through the rectifying commutator 57 to the self exciting winding 59. Current flows, because the connections 107 provide a split circuit for the current flowing in the inner legs G, this current being due to the inductive action of the magnet field. The outer set of legs H would normally receive this flow but reactance impedance resists the flow, thereby forcing it to take place mainly through the inner row G of legs, through the cross connections 107 and through the back of segments I. As illustrated in Fig. 9, flow would be from a brush 56 at $a$ to a bar 32 and down through one leg G of the bar at $b$, because reactance impedance at $c$ of leg H would be strong, thence through a rear segment I to region $d$ of the next bar 32, up, over and to region $e$, where shunting would take place over connection 107, due to said impedance at $f$. This action would be continued for each segment I until the current is thrown out at $g$. This current is still alternating, the shunting method providing means whereby the closed alternating current circuits of the bars 32 can be made to yield current at the leads $a$ and $g$.

The rectifying collector ring 57 is of usual segmental construction, the segments being arranged to pick up the proper polarity of current from the brushes 56. It will be noted that the ratio of movement between the brushes 56 and the commutator 57 varies directly as the ratio of movement between the inductors 32 and their cutting field due to magnets 1, so that the generation and transmission of current values are synchronized at all relative speeds for perfect field exciting action.

When the slip is greatest, that is, at low car speeds, the reactance impedance is highest. Hence more current is shunted around the rotor to the inner generator magnet field and the torque exerted is increased. Hence the current is fed through the brushes 56 engaging the rectifying commutator 57, the latter rectifying and delivering said current to the windings 59. It is to be understood that suitable wiring is used on the magnet spider, rotor and stator to effect the connections herein described.

Fig. 12, which is a diagram of excitation and control accessories, will be referred to in the following:

It has been found desirable to provide means for varying the density of the field flux of the spider magnets in some proportion to the speed variation thereof, so that the vehicle will not move when the prime mover is turning over slowly at idling speeds. To accomplish this the ordinary three-brush car-lighting and battery-charging auxiliary generator 75 is used to partly excite the magnet field by way of separately excited windings 60. However, the third brush field of the generator 75 is not used when the translator is being excited. In order to accomplish this, a lever 76 is provided which is attached by means of link 103 for operation with said clutch pedal 20 and clutch lever 22 so that the lever 76 may assume position X when the clutch is released and the electrical drive is had, position Y which is neutral, and position Z which is had when the clutch is engaged for direct drive. It can also take up position 105 representing open circuit conditions, when the lever 22 (Fig. 4) is depressed for reverse operation. When the lever 76 is in position X (electrical drive) contacts 77 are closed for obtaining auxiliary generator excitation from battery 78, the opposite contacts 79 being opened to prevent the third brush excitation of said auxiliary generator.

Under the above conditions (lever 76 at position X) the generator 75 is used for exciting the separately excited field coils 60 by way of contacts 80. The auxiliary generator third brush leads are then dead. The auxiliary generator field 81 is then excited to a constant density by the battery and the output of the auxiliary generator will then vary directly with variations in speed of the prime mover, so that when the prime mover idles, there is no appreciable driving effect.

When the switch lever 76 is in position Z, the power translator proper is dead, the clutch being closed for direct drive and the auxiliary generator 75 is in electrical connection with the conventional battery reverse current cut out (see contacts 82) and the field 81 is supplied by the current from the third brush 83 (see contacts 79), thus providing third brush field regulation, as is had in the ordinary car-lighting and battery-charging circuits.

As above described, the self excited field coil 59 is excited by the current which is taken from some or all of the flux-reversing windings 32, this current being passed through the brushes 56 and rectifier commutator 57 hereinbefore described.

The separately excited field coils 60 provide sufficient excitation for light load operation. The self excitation obtained at coils 59 by way of the rectifying commutator 57 from bars 32 or an extra winding is intended primarily to build up enough field flux to overcome the reaction from the inductor bars in the rotor when carrying heavy currents.

It is to be understood that the auxiliary generator 75 or other means such as a battery may be used for the complete excitation of the translator. However, the system shown makes it possible to use the present equipment which is furnished for car lighting and battery charging on the present day automobiles.

From the above description it is clear that the translator includes the alternating current generator comprising the rotating magnet spider 1 and the internal row G of inductors 32. It also includes the alternating current electric motor element comprising the external row H of inductor bars 32 taken with the inductor bars 72 of the stator. The magnet spider forms a rotating generator field. It is to be understood that any of the inductor bars may be referred to as windings and that the windings of the rotor (the U-bars) form a motor primary circuit as well as part of the generator secondary circuit, that is, they comprise a power circuit between the generator and motor inductors. This circuit is permanently closed without sliding contacts or connections.

The following remarks will aid in understanding this device:

The current generated is alternating instead of direct, as in the case of prior machines of the same general class, the use of alternating current having the advantage of eliminating sliding contacts for carrying the power circuit. Also, the electrical circuit is much shorter.

The relative motion between the magnet spider and rotor generates current for motorizing and at the same time effects drag, the drag effect and the motorizing effect being additive.

The regulation of the torque between the magnet spider and the rotor is inherent and may be controlled by proper designs. The resistances and reactances of the circuit should be so designed that the current and active flux values in the rotor bars and magnet spider respectively multiply out to give the same product at any given normal operating speed.

Shortly stated, the machine comprises a polyphase alternating current generator and a polyphase alternating current motor built integrally in such a manner that the circuits between the generator inductors and the motor primary are always closed and require no collecting rings or sliding contacts. Also, where the slip between two generating elements produces nearly engine torque for use in driving the driven shaft, it in addition produces an alternating current for use in providing additional torque at the driven shaft.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A power translator comprising means for effecting a rotating generator field, a rotor having inductors adapted to be acted upon by said field to induce current in the inductors and effect a magnetic drag for driving the rotor in the direction of movement of the generator field, members in circuit with said inductors, said members being so formed and placed in the rotor as to effect per se reverse rotation of a second field due to the induced current, and stationary inductors adapted to be acted upon by said second field to effect reaction in a direction adapted to aid in driving the rotor in the direction of generator field movement.

2. A power translator comprising a polyphase alternating current generator, a polyphase alternating current motor, in which one set of inductors of the generator and one set of inductors of the motor are carried by a common rotatable member, both sets of inductors being in permanently closed circuit with each other and centrifugally operated members arranged upon said rotatable member adapted to short circuit at least some of the generating inductors at a predetermined rotative speed.

3. A power translator comprising means for effecting a rotating generator field, a rotor having inductors adapted to be acted upon by said field to induce current in the inductors and effect a magnetic drag for driving the rotor in the direction of movement of the generator field, members in circuit with said inductors, said members being so placed in the rotor as to effect reverse rotation of a second field due to the induced current and stationary inductors adapted to be acted upon by said second field to effect repulsion in a direction adapted to aid in driving the rotor in the direction of generator field movement and a clutch for connecting and disconnecting the rotor and the rotating generator field means.

4. A power translator comprising an alternating current generator, an alternating current motor and a rotor carrying inductors for the generator and inductors for the motor, said generator including a magnetic field member, means for exciting said member with current taken from the inductors, a centrifugally operated short circuiter for the inductors operable when a predetermined speed is attained and a rectifier for changing the alternating current to direct current as it is delivered to the magnetic field member, regardless of the number of inductors in operation.

5. A power translator comprising an alternating current generator, an alternating current motor and a rotor carrying inductors for the generator and inductors for the motor, said generator including a magnetic field member, means for exciting said member with current taken from the inductors, a centrifugally operated short circuiter for the inductors operable when a predetermined speed is attained and a rectifier for changing the alternating current to direct current as it is delivered to the magnetic field member, regardless of the number of inductors in operation and a clutch for locking the magnetic field member with the rotor whereby all electrical action is prevented and a direct mechanical drive is had.

6. A power translator comprising an alternating current generator, an alternating current motor and a rotor carrying inductors for the generator and inductors for the motor, said generator including a magnetic field member and a centrifugally operated short circuiter for the inductors adapted to reduce motor action.

7. A power translator comprising an alternating current generator, an alternating current motor and a rotor carrying inductors for the generator and inductors for the motor, said generator including a magnetic field member and a centrifugally operated short circuiter for the inductors adapted to reduce motor action and a clutch for joining the rotor with the generator magnetic field member adapted to be closed after short circuiting has occurred.

In testimony whereof, we have signed our names to this specification this 16th day of November, 1928.

MARTIN PHILLIP WINTHER.
ANTHONY WINTHER.